March 17, 1970 P. M. CASSIERS ET AL 3,501,330
MANUFACTURE OF ELECTROPHOTOGRAPHIC MATERIALS
Filed Oct. 22, 1965 2 Sheets-Sheet 1

INVENTORS
PAUL MARIA CASSIERS
FELIX FREDERIK DE SMEDT

United States Patent Office 3,501,330
Patented Mar. 17, 1970

3,501,330
MANUFACTURE OF ELECTROPHOTOGRAPHIC
MATERIALS
Paul Maria Cassiers, Mortsel-Antwerp, and Felix
Frederick De Smedt, Wilrijk-Antwerp, Belgium,
assignors to Gevaert-Agfa N.V., Mortsel, Belgium,
a Belgian company
Filed Oct. 22, 1965, Ser. No. 502,150
Claims priority, application Great Britain, Oct. 26, 1964,
43,597/64
Int. Cl. C03c 3/26; B44d 1/092, 1/094
U.S. Cl. 117—34                14 Claims

ABSTRACT OF THE DISCLOSURE

A method of making electrophotographic materials in the form of either a coating on a supporting sheet or a self-supporting sheet wherein inorganic photoconductive materials are incorporated into a hot melt of a polyethylene or polyester and the mixture is extruded to form a film. Additives such as lubricants, sensitisers, etc. may be used.

---

Figure 1:
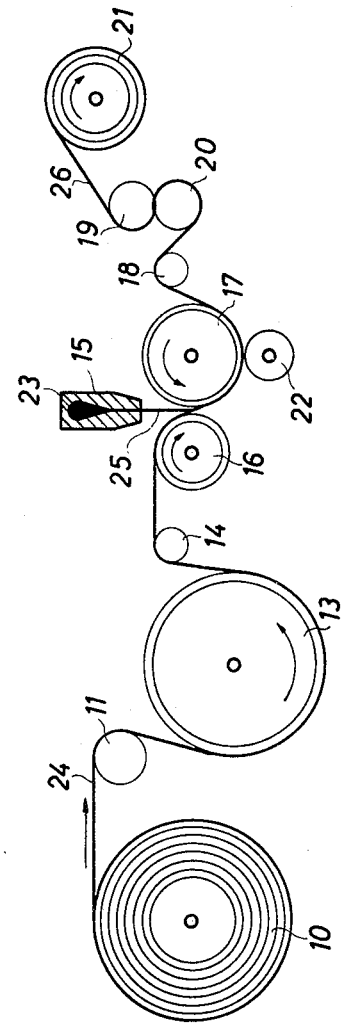

This invention relates to a process for the manufacture of electrophotographic materials, more especially to the manufacture of a photoconductive melt-extruded film.

Photoconductive binder-type coatings prepared by incorporating a finely divided photoconductor in a binder are well known. Such coatings offer certain advantages over the rigid selenium coatings in respect of their flexibility and their fitness for being spectrally sensitized.

As photoconductive substances in such coatings, determined inorganic as well as organic substances can be incorporated, e.g. sulphur, selenium, the oxides, sulfides and selenides of zinc, cadmium, mercury, antimony, bismuth and lead, anthracene, anthraquinone and more recently discovered organic monomeric and polymeric organic photoconductors, such as e.g. those described in the U.S. patent specifications Nos. 3,113,022; 3,131,060; 3,140,946; 3,148,982; 3,155,503 and 3,158,475, the U.S. patent applications Ser. Nos. 11,128 of Cassiers et al., filed Feb. 26, 1960, now abandoned; 84,474 of Van Paesschen et al., divided and now U.S. Patent Nos. 3,240,594 and 3,240,595; 328,172 of Noe et al., filed Dec. 5, 1963, now abandoned; 426,681 of Noe et al., now U.S. Patent No. 3,274,000; the U.K. patent specification No. 964,873, and the Belgian patent specification No. 587,300.

The use of photoconductive substances combined with insulating binder agents is known among others from the U.S. patent specifications Nos. 2,197,552; 2,297,691; 2,485,589; 2,551,582 and 2,599,542 and from the U.K. patent specifications Nos. 566,278, 693,112 and 700,502.

Phosphor type photoconductive materials and specially doped cadmium sulfide dispersed in a silicone resin binder, are described by Wainer, E. Photogr. Eng. 3 (1952) 12. Such layers are suited for image formation by persistent internal polarization which technique is described by H. P. Kallmann and J. Rennert, Electronics, Aug. 28, 1959, pp. 39–41. Thermoplastic recording layers containing a thermoplastic photoconductive polymer or thermoplastic polymer with a photoconductor dissolved or dispersed therein are suited for the thermoplastic recording technique described in the U.S. patent specification 964,881.

Young, C. I. and Greig, H. G., R.C.A. Rev. 15 (1954) 469 describe an electrophotographic material containing a photoconductive layer comprising a specially prepared photoconductive zinc oxide in an insulating resin binder. Said layer is coated on a sufficiently conductive paper base, e.g. a clay-coated paper, from a paint-like coating mixture by conventional paper-coating techniques. Since the zinc oxide has a brilliant white color it forms an excellent base for contrasting with the developer materials applied to it.

According to existing techniques, the photoconductive binder coatings thus are prepared by dispersing or dissolving the photoconductive substances in a solution of an insulating binder, and by applying them as such in the form of a layer to a suited relatively conductive support. For the application of those techniques are described the use of organic solvents (German published patent application No. 1,031,127) as well as the use of water (German patent specification Nos. 958,355 and 1,040,900) as a liquid medium.

The coating techniques making use of a solvent or liquid for dispersion or emulsion preparation possess the disadvantage that the applied liquid has to be removed. Evaporation of the liquid is of most common use but requires cumbrous drying devices and a high calorie investment. A coating method avoiding the solvent problem is e.g. melt extrusion. Although for many applications this technique is of common use, said technique is up to now not introduced in the field of the manufacturer of photoconductive binder coatings, or binder and photoconductor containing self-supporting sheets.

According to the present invention an electrophotographic material comprising a photoconductive element, comprising a photoconductive substance incorporated in a film-forming thermoplastic high molecular weight polymer as binder, is prepared by a method comprising the steps of mixing photoconductive substance in finely divided form with the binder in powder form and melt-extruding the obtained mixture.

According to one embodiment the photoconductor-binder melt composition is extruded through a slit-type die, and the extruded mass joined with a relatively electrically conductive base sheet or web. Such an extrusion coating operation is illustrated by accompanying FIGURE 1.

The photoconductor-binder melt composition 23 is extruded through a slit-type die 15, downward between two rolls, one of which is a not completely rigid pressure roll (16), the other being a rigid roll (17). The extruded film 25 is fed between the base material 24 and the roll 17, e.g. a metal roll, and base material 24 and extruded film 25 are joined by pressure between the roll 16 e.g. a rubber roll and the roll 17. The base material 24 can be preheated by a preheating roll 13. A pressure roll 22 may improve the adhesion of the base material to the photoconductive layer and improve the smoothness of the latter. The rolls 19 and 20 are cooling rollers. The recording material 26 is wound up on the winder roll 21. The rollers 11, 14 and 18 are guiding rollers.

More particulars about extrusion coating are given by Allan L. Griff, Plastics Extrusion Technology, Reinhold Publishing Corporation, New York (1962) pp. 113–123.

Figure 2:
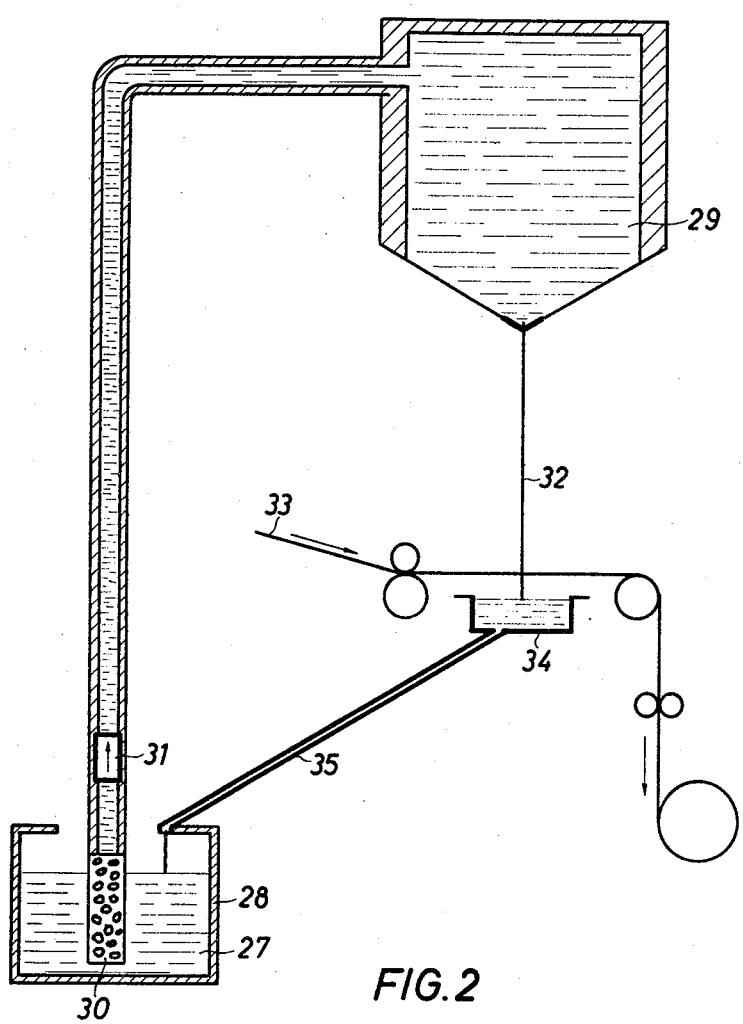

According to another embodiment the photoconductor-binder melt composition may be applied to a sheet-like or web-like base material using a pressure curtain coater. Such a coater is schematically represented by FIG. 2. In said type of coater the binder and photoconductor are fed in mixed state to a melt tank 27. The said tank is heated by circulating hot oil 28. The mixture of photoconductor and melted polymer is fed to a pressure tank 29 through a filter 30 by a pump 31. The pressure tank has a slit-type die through which the melt is extruded as a curtain 32. The base material 33 passes through the curtain of the coating material at a speed necessary to deposite the coating in the desired thickness. The coating thickness is determined by the speed of the substrate, the velocity of the curtain and the volume of the curtain. The excess of the melt is received in the excess return tray 34, which is connected by a drain 35 with the melt tank 27. Although the curtain coater was designed primarily for coating sheet stock, it proves to be very suited also for web coating.

The thickness of the photoconductive element (layer or self-supporting sheet) depends on the use of the element. The thickness of the photoconductive layer normally varies between 3 to 30μ; the thickness of sheets normally varies between 30 to 200μ.

It has been stated in photoconductive layers consisting of photoconductors dispersed in a binder, that the grains lying near the surface may not be covered by a binder layer, which is too thick. Such layers when charged by corona will not allow a complete dissipation of the charge under irradiation. The resulting material shows poor sensitivity and contrast.

Developing processes, which rely on chemical or physical reactions with the photoconductor grains (such processes are described e.g. in the U.S. patent applications Ser. Nos. 368,312 of Van den Heuvel et al. filed May 18, 1964, 368,313 of Van den Heuvel et al. filed May 18, 1964, and 150,820 of Cassiers et al. filed Nov. 7, 1961, now abandoned will not give satisfactory results if the chemical compound present in said layer e.g. the photoconductive zinc oxide cannot be reached by the reagents.

So it has been stated that on the contrary, optimal sensitivity of the material and better development results are obtained if the photoconductor grains are partially protruding from the layer, or are covered only by a very thin layer of binder.

More particulars about such layers can be found in the U.S. patent application Ser. No. 144,579 of Cassiers et al., now Patent No. 3,281,240 and in the U.K. patent specification No. 940,577.

If in the surface of a layer obtained by extrusion the ratio of dispersed photoconductive substance to binder is too low, several methods can be applied to increase the photoconductor content of the surface, e.g.

(a) by grinding off the surface of the recording layer or sheet,
(b) by extracting with a solvent the binding agent from said surface,
(c) by applying the photoconductive layer to a porous base material wherein a certain amount of binder is absorbed or can penetrate e.g. by a heat-treatment,
(d) by applying additional photoconductor in powder form on the surface, when the binding agent is still sufficiently plastic and adhering said powder to the binding agent present in said surface, e.g. by pressure.

According to a preferred embodiment of the latter technique, the photoconductive substance e.g. zinc oxide grains, sensitized or not, are applied by the roller 17 of FIG. 1. The zinc oxide grains can be applied to the said roller by electrostatic attraction e.g. by charging the surface of said roller.

According to another embodiment, the photoconductor-binder melt composition is extruded through a slit-type die as a self-supporting sheet and a conductive backing (if one is necessary in the applied recording technique) applied to the extruded sheet e.g. from a liquid (solution, dispersion or emulsion) or is vacuum-coated. Alternatively, conductive particles such as metallic powder or carbon black can be attracted to the sheet immediately after the extrusion step and pressed in the softened surface.

The ratio of photoconductor in respect of binder is comprised between 50 and 90% by volume.

The melt extrusion of photoconductive layers or self-supporting sheets, which contain a content (50%) of dispersed photoconductive substance, e.g. zinc oxide, is not so simple because the friction coefficient of a dispersion of such photoconductor substances in a melted film-forming polymer is too high for the existing extruders. It has been found that the friction coefficient of mixtures with a high photoconductor content can effectively be decreased by the addition of lubricants, e.g. butyl stearate or paraffin oil. Colourless or white lubricants being solid at room temperature are preferred. In this connection colourless or white metal soaps are mentioned, e.g. zinc stearate.

In order to increase the adherence of the melt extruded mass to the base material between the latter and the melted mass, a potential difference is applied. According to a preferred embodiment the base material is pre-treated with a corona-discharge.

An addition of 5% by weight of zinc stearate to a composition consisting of 80% by weight of zinc oxide and 20% by weight of melted thermoplastic polymer such as polyethylene suffices for ensuring a good lubrication in a usual screw extruder.

The photoconductive composition used for melt-extrusion may contain suited additives to improve the chemical and/or physical characteristics of the extruded layer or sheet e.g. additives for sensitization, gloss-enhancement, plasticizing, oxidation-inhibiting and optical brightening, and compounds other than photoconductors playing a role in the image formation e.g. compounds which are able to react with the developing substances.

Self-evidently the binder of photoconductive substances has to meet some requirements in addition to those that are made upon thermoplastic polymers, which are extruded as homogeneous layers or sheets; thus, it has to be taken into account that for the melt-extrusion of photoconductive compositions, that the binder should be sufficiently insulating and preferably possesses a specific resistivity larger than $10^{10}$ ohm cm., and that the binder does not or practically does not impair the photoconductive properties of the photoconductive substances.

Binders that are considered for the process of the present invention, of course, have to be thermoplastic and to possess a sufficiently high molecular weight, in order to form a film when melt-extruded, normally they have a molecular weight larger than 2000, the film-forming properties are, however, not only depending on the molecular weight but also depend on the chemical structure of the binder. In practice the formation of a flexible film is preferred.

Classes of polymers from which suited thermoplastic binders can be chosen for the process of the present invention are: polyesters, and polyethylene, the latter being described more detailedly by Harro Hayen and Hans Domininghaus, Polyäthylen und andere Polyolefine, Verlag Brunke Garrels, Hamburg, 2nd edition (1961). Interesting polyesters for being applied as binders in the present invention are described in the U.S. patent application Ser. No. 343,061 of Troeyer et al. filed Feb. 6, 1964, now abandoned.

The photoconductive substances and additives used in the extruded layers or sheets have to be resistent to the relatively high temperature appearing during extrusion. The inorganic photoconductors generally meet this requirement.

The extrusion temperature is a function of the properties of the binder composition, among others its melting point, its melt viscosity, its compatibility with the photoconductor used, and the nature as well as the amount of the lubricant incorporated therein.

The mostly occurring extrusion temperatures range from 100° C. to 350° C.

By an appropriate choice of binder, an after-hardening can be applied according to usual techniques.

The support for extruded photoconductive coating has to meet the requirements made upon a support for electrophotographic material and moreover has to be sufficiently thermostable in order to adhere to the extruded mass.

A wide choice of materials exists here, among others metal sheets, paper, which occasionally can be rendered more conductive by an after-treatment, fabrics and sheets of plastics, which, if not sufficiently conductive, can be rendered more conductive internally and/or at their surface according to known techniques.

Suited supports for photoconductive layers are described among others in the U.K. patent specification No. 964,873.

The following examples illustrate the present invention.

EXAMPLE 1

1000 g. of high density linear polyethylene (density in g./cm.$^3$ at 25° C.: 0.96—softening point: 127° C.) are poured in powder form in a rotating drum and wetted with 40 g. of monobutyl phosphate. To this mixture 200 g. of zinc stearate and 4000 g. of photoconductive zinc oxide are added. The whole composition is thoroughly mixed for 15 min. The purpose of the mono-butyl phosphate is to increase the dark-decay time of the zinc oxide. Zinc stearate is used as a lubricant. The mixture is fed into an extruder having a slit-type die (width of the slit: 300 mm.; distance between the lips: 0.5 mm.). Coating occurs as schematically illustrated in FIG. 1. The support material is a usual spirit duplicating paper having a weight of 90 g./sq. m. The paper is then preheated to 120° C. with an infrared radiator. The travelling speed of the paper is chosen greater than the delivery speed of extruded film in such a way, that the thickness of the applied film is reduced to 0.05 mm.

The temperature program in the extruder cylinder was as follows:

| | |
|---|---|
| Feed zone | ° C.__ 230 |
| Melting zone | ° C.__ 240 |
| First metering zone | ° C.__ 245 |
| Second metering zone | ° C.__ 250 |

EXAMPLE 2

1000 g. of low molecular weight polyethylene (density in g./cm.$^3$ at 25° C.: 0.91—softening point: 108° C.) are blended with 150 g. of zinc stearate, 1000 g. of photoconductive cadmium sulphide and 3000 g. of photoconductive zinc oxide.

The melt is applied as described in Example 1 to a parchment paper of 65 g./sq. m.

We claim:

1. A method of producing an electrophotographic material comprising a photoconductive layer carried on a web or sheet support which comprises the steps of admixing an inorganic photoconductor in finely divided form with a film-forming thermoplastic binder in powdered form, the proportion by volume of said photoconductor relative to said binder being in the ratio of 50/50–90/10, said binder having a specific resistance of at least 10$^{10}$ ohm cm. and being fusible at a temperature in the range of 100–350° C. and being selected from the group consisting of a polyester resin and polyethylene, heating said mixture to a temperature in the range of 100–350° C. to fuse said binder and while said binder is fused, pressure extruding the mixture through a slit-like orifice onto said support to deposit a thin layer of the mixture thereon, and allowing said layer to cool to harden said binder.

2. The method of claim 1 wherein a minor amount of lubricant is incorporated in said mixture.

3. The method of claim 1 wherein said photoconductor is photoconductive zinc oxide.

4. The method of claim 1 wherein a web of said support is advanced along a generally horizontal path and said mixture is extruded as a downwardly falling sheet or curtain onto said moving web.

5. The method of claim 1 wherein said photoconductive layer after application to said support and cooling, is treated to expose particles of said photoconductor on the surface thereof.

6. A method according to claim 1, wherein the base material is preheated before being joined with the melt extruded photoconductive composition.

7. A method according to claim 1, wherein the extruded melt is applied onto a base material to which a potential difference is applied in respect of the extruded melt.

8. A method according to claim 1, wherein the extruded melt is applied onto a base material which is charged by a pre-treatment with a corona-discharge.

9. A method of producing an electrophotographic material comprising a self-supporting photoconductive layer which comprises the steps of admixing an inorganic photoconductor in finely divided form with a film-forming thermoplastic binder in powdered form, the proportion by volume of said photoconductor relative to said binder being in the ratio of 50/50–90/10, said binder having a specific resistance of at least 10$^{10}$ ohm cm. and being fusible at a temperature in the range of 100–350° C. and being selected from the group consisting of a ployester resin and polyethylene, heating said mixture to a temperature in the range of 100–350° C. to fuse said binder and while said binder is fused, pressure extruding the mixture through a slit-like orifice to form a thin self-supporting layer of the mixture and allowing said layer to cool to harden said binder.

10. The method of claim 9 wherein a minor amount of lubricant is incorporated in said mixture.

11. The method of claim 9 wherein said photoconductor is photoconductive zinc oxide.

12. The method of claim 9 wherein said photoconductive layer after formation and cooling, is treated to expose particles of said photoconductor on the surface thereof.

13. A method according to claim 9, wherein the self-supporting sheet at one side is coated with a conductive layer.

14. A method according to claim 13, wherein the self-supporting sheet at one side is vacuum-coated with a metal layer.

References Cited

UNITED STATES PATENTS

| | | | |
|---|---|---|---|
| 2,314,453 | 3/1943 | Mack et al. | 117—105.3 XR |
| 2,952,559 | 9/1960 | Nadeau | 117—93.4 XR |
| 3,052,540 | 9/1962 | Greig | 117—34 XR |
| 3,206,323 | 9/1965 | Miller et al. | 117—93.4 XR |
| 3,251,686 | 5/1966 | Gundlach | 117—34 XR |
| 3,251,687 | 5/1966 | Fohl et al. | 96—1.7 |
| 3,287,121 | 11/1966 | Hoegl | 96—1.5 |
| 3,300,304 | 1/1967 | Kosche | 96—1.5 |
| 3,341,472 | 9/1967 | Hewett et al. | 252—501 |
| 3,345,161 | 10/1967 | Mammino et al. | 96—1.7 |
| 3,346,381 | 10/1967 | Greig | 96—1.8 |

FOREIGN PATENTS 1,202,421   7/1959   France.

ALFRED L. LEAVITT, Primary Examiner.

J. H. NEWSOME, Assistant Examiner.

U.S. Cl. X.R.

96—1.5, 1.8; 106—292, 301, 308; 117—8, 47, 62, 93.1, 93.4, 102, 105.3, 161; 252—501; 264—211, 176